(12) United States Patent
Takahashi

(10) Patent No.: US 7,574,779 B2
(45) Date of Patent: Aug. 18, 2009

(54) STRING HOLDER

(75) Inventor: Yoshinobu Takahashi, Kurobe (JP)

(73) Assignee: YKK Corporation, Tokyo (JP)

( * ) Notice: Subject to any disclaimer, the term of this patent is extended or adjusted under 35 U.S.C. 154(b) by 406 days.

(21) Appl. No.: 11/490,352

(22) Filed: Jul. 20, 2006

(65) Prior Publication Data

US 2007/0022575 A1    Feb. 1, 2007

(30) Foreign Application Priority Data

Jul. 26, 2005   (JP)   ............... 2005-215709

(51) Int. Cl.
*F16G 11/04*    (2006.01)
*F16G 11/00*    (2006.01)

(52) U.S. Cl. .................. 24/136 L; 24/136 R

(58) Field of Classification Search .......... 24/115 H, 24/115 K, 115 M, 115 R, 136 L, 136 R, 712.5; 292/307 R, 315, 323, 327
See application file for complete search history.

(56) References Cited

U.S. PATENT DOCUMENTS

| | | | | |
|---|---|---|---|---|
| 2,573,806 A | * | 11/1951 | Paterson | 24/136 R |
| 3,897,161 A | * | 7/1975 | Reinwall, Jr. | 24/115 R |
| 3,965,544 A | * | 6/1976 | Boden | 24/136 R |
| 4,102,019 A | * | 7/1978 | Boden | 24/712.5 |
| 4,156,574 A | * | 5/1979 | Boden | 24/115 M |
| 4,455,717 A | * | 6/1984 | Gray | 24/115 R |
| 4,719,671 A | * | 1/1988 | Ito et al. | 24/115 R |
| 4,895,402 A | * | 1/1990 | Tomita | 292/307 R |
| 5,454,140 A | | 10/1995 | Murai | |
| 5,903,959 A | * | 5/1999 | Leonardi | 24/712.1 |
| 6,457,214 B1 | * | 10/2002 | Boden | 24/136 R |
| 7,140,078 B2 | * | 11/2006 | Watabe | 24/115 G |
| 7,346,963 B2 | * | 3/2008 | Takahashi | 24/136 R |

FOREIGN PATENT DOCUMENTS

| | | |
|---|---|---|
| CN | 1103566 A | 6/1995 |
| JP | 9-289906 | 11/1997 |
| JP | 10-14620 A | 1/1998 |
| JP | 2002-17411 | 1/2002 |
| TW | 338265 | 8/1998 |

OTHER PUBLICATIONS

Taiwanese Search Report for Taiwanese Patent Application No. 095126971, dated Jun. 17, 2008.

* cited by examiner

*Primary Examiner*—Robert J Sandy
*Assistant Examiner*—Ruth C Rodriguez
(74) *Attorney, Agent, or Firm*—Alston & Bird LLP

(57) ABSTRACT

A substantially cylindrical socket (10) and a plug (20) to be inserted into the socket (10) are provided. The socket includes a string opening (11), a plug opening (12), an accommodation section (13) in communication with the string opening and the plug opening, a plurality of holding sections (14) for holding string ends (1A) accommodated in the accommodation section, and a widening section (17). The plug (20) is provided with a plurality of pressing legs (24) capable of being widened toward the respective holding sections. The widening section abuts to the pressing legs when the plug is almost fully inserted into the socket (i.e. when at least substantially more than half of the plug is inserted) to press the string ends to the holding sections.

10 Claims, 14 Drawing Sheets

STRING HOLDER

BACKGROUND OF THE INVENTION

1. Field of the Invention

The present invention relates to a string holder to be attached to a string end.

2. Description of Related Art

Strings are generally used for various purposes. Specifically, strings are widely used, for example, for closing an opening in shoes, bags, garments and personal ornaments or for adjusting a size thereof. Strings are also used in a variety of different circumferences such as in connecting items to each other or fixing cargos.

It should be noted that the word "strings" refers to general string-like bodies that can be tied, which includes not only a typical string, wire and cable but also a tape, belt and the like.

Such strings are usually end-treated. If a string end left as being cut off without any treatment, the cross section of the string end will not be pleasing to the eye or to the touch. When the string is made by weaving, the string end may be frayed. One simple end-treatment is knotting the end. A dedicated string holder is also used for better operability and decoration.

There has been developed a string holder that covers an end of a string (a region of a predetermined length from the string end) to eliminate a trouble of making a knot of the string.

One concrete example is a string holder that has a substantially cylindrical main body to which a string end is inserted and a lock member that is inserted from the other side of the string end such that a projection of the lock member bites into the string end for fixation (see, for instance, patent document 1: Japanese Patent Laid-Open Publication No. H09-289906, page 4, FIGS. 1 and 6).

As another example, there is known a string holder including a male element and a female element, in which a projection is adapted to bite into a string in a direction intersecting the string; and tip ends of the string are bent in order to restrain its length (see, for instance, patent document 2: Japanese Patent Laid-Open Publication No. 2002-17411, pages 3 to 4, FIGS. 1 to 3).

According to the above-mentioned patent documents 1 and 2, a tapered hole is provided in a socket (the main body or the female member) and the string is fixed between the tapered hole and a plug (the lock member or the male member), where load applied in inserting the plug into the socket gradually increases in accordance with the advancement of the plug by the tapered hole of the socket, so that is becomes difficult to fix the string by inserting the plug into the socket. In other words, the disadvantage is the difficulty in the assembling.

In a case of a string of which surface is covered with a knit material, the above-described projection can be hung in meshes, thereby providing good biting ability. In contract, in a case of a recently available string that employs an elastomer as a core material, the string is easily deformed when the projection bites into, so that enough biting ability cannot be obtained.

SUMMARY OF THE INVENTION

An object of the present invention is to provide a string holder capable of being easily assembled while having enhanced immovably attaching ability onto a string.

A string holder according to an aspect of the present invention includes a main body that can accommodate a plurality of string ends. The main body includes a substantially cylindrical socket and a plug to be inserted into the socket. The socket has a string opening for the string ends to be inserted therein, a plug opening for the plug to be inserted therein, an accommodation section for accommodating a predetermined length of the string ends inserted from the string opening, and a plurality of holding sections for holding the string ends accommodated in the accommodation section. The accommodation section is in communication with the string opening and the plug opening. One of the socket and the plug is provided with a plurality of pressing legs capable of being widened toward the holding sections to press the string ends to the holding sections. The other of the socket and the plug is provided with at least one widening section that abuts to the pressing legs to widen the pressing legs toward the holding sections as the plug is inserted.

In such as arrangement, the string ends are inserted from the string opening of the socket and accommodated in the accommodation section, while the plug is inserted from the plug opening of the socket. Since the pressing legs are not widened until the plug is inserted into the socket and the pressing legs provided to one of the socket and the plug abuts to the widening section provided to the other, the insertion load will not be increased. Since the insertion load will not be increased until the widening section abuts to the pressing legs, the plug can be smoothly inserted into the socket, thereby facilitating the assembling process.

As a next step, when the plug is further inserted into the socket after the plug is inserted into the socket and the widening section abuts to the pressing legs, the widening section widens the pressing legs toward the respective holding sections provided on the socket, so that the string ends accommodated in the accommodation section will be pressed to the respective holding sections. At this time, since the plug has been inserted into the socket and the posture of the plug relative to the socket is stable, the widening section can stably widen the pressing legs. Consequently, the string ends accommodated in the accommodation section are firmly fixed while being sandwiched by the pressing legs and the holding sections, thereby enhancing the immovably attaching ability of the string holder relative to the string.

With a string holder according to an aspect of the invention, the plug may preferably have a base to shut the plug opening of the socket and a press section integrally formed to extend from the base to be inserted into the accommodation section. The pressing legs may preferably be formed in the press section. The widening section may preferably be formed on the socket.

In such an arrangement, since the plug includes the base that can shut the plug opening and the press section integrally formed to extend from the base, the plug opening of the socket can be shut by the base. Hence, a good appearance can be obtained, while preventing dust from entering into the socket.

In addition, since the plug is provided with the plurality of pressing legs capable of being widened toward the holding sections and the socket is provided with the widening section, the manufacturing process can be facilitated. If, for example, the socket is provided with the plurality of pressing legs capable of being widened, the plurality of pressing legs capable of being widened need to be formed inside the cylindrical socket, which accompanies troublesome manufacturing process. In contrast, in accordance with this arrangement, the manufacturing can be facilitated. Especially, if the socket and the plug are made of synthetic resin by injection molding, the die machining will be extremely complicated, requiring much more manufacturing steps.

With a string holder according to an aspect of the invention, the pressing legs may preferably be formed on a tip end portion of the press section. The widening section may preferably be formed in the vicinity of the string opening of the socket.

Herein, the vicinity of the string opening of the socket means the string opening side off the center of the cylindrical socket.

In such an arrangement, it is not until the plug is almost fully inserted into the socket that the widening section abuts to the pressing legs. That is, the widening section does not abut to the pressing legs before that, so that a great load against the insertion of the plug will not be generated, thereby facilitating the assembling process.

Subsequently, when the plug is almost fully inserted into the socket, the widening section then abuts to and widens the pressing legs. Since the posture of the plug relative to the socket is the most stable when the plug is almost fully inserted into the socket, the widening section can stably widen the pressing legs. Thus, the string ends can be securely sandwiched and held by the pressing legs and the widening section.

Further, since the string ends are not fixed until the pressing legs start being widened; and a moving distance of the plug from the start of the widening to a time point when the string ends become fixed to the socket is short, the string ends can be securely fixed without being displaced in position.

With a string holder according to an aspect of the invention, the widening section may preferably be tapered in a direction reverse to a direction in which the plug is inserted relative to the socket.

In such an arrangement, since the widening section has a shape tapered in the reverse direction of the plug-inserting direction, the pressing legs can be easily widened when the plug is inserted into the socket and the widening section abuts to the pressing legs.

With a string holder according to an aspect of the invention, the widening section may preferably be disposed between the plurality of holding sections.

In such an arrangement, since the widening section is disposed between the plurality of holding sections, the pressing legs can press the string ends at the center of the holding sections. Hence, the string ends can be sandwiched and held by a strong holding force.

With a string holder according to an aspect of the invention, the holding section may preferably be formed as a V-groove widened toward the center of the socket.

In such an arrangement, since the holding section is formed as a V-groove, resistance against pulling force of the string ends can be great, enhancing high immovably attaching ability.

With a string holder according to an aspect of the invention, the plug may preferably be provided with at least one temporarily fixing section for temporarily fixing the string end.

In such an arrangement, the string ends are inserted from the spring opening of the socket through the accommodation section to be projected out of the plug opening and then temporarily fixed in the temporarily fixing sections of the plug. In this state, by pulling the string ends back while inserting the plug into the plug opening of the socket, the string ends can be accommodated in the socket in a predetermined posture.

Subsequently, the string ends are pressed by the pressing legs to the holding sections, so that the secure and immovable attachment can be obtained.

With a string holder according to an aspect of the invention, a first slit defining the pressing legs may preferably be formed in the tip end portion of the press section of the plug in a direction in which the plug is inserted. A second slit may preferably be formed in a base portion of the press section so as to be substantially orthogonal to the first slit. A notch may preferably be formed in the base portion of one of separated walls that are separated by the second slit. Sandwiching pieces opposing with each other with the second slit interposed may preferably be formed on the respective separated walls projectingly, the opposing sandwiching pieces defining the temporarily fixing section.

In such an arrangement, since the first slit forming the pressing legs is provided on the tip end portion of the press section of the plug along the plug-inserting direction, the pressing legs can be elastically deformed outward due to the first slit, so that the string ends can be securely held by the pressing legs. Further, since one of the separated walls having the sandwiching pieces (the temporarily fixing sections) is provided with the notch, the string ends can be securely held by virtue of the elastic deformation of the both separated walls even when the thickness of the string end varies.

DETAILED DESCRIPTION OF PREFERRED EMBODIMENT(S)

An first embodiment of the present invention will be described below with reference to the accompanying drawings.

Figure 1:
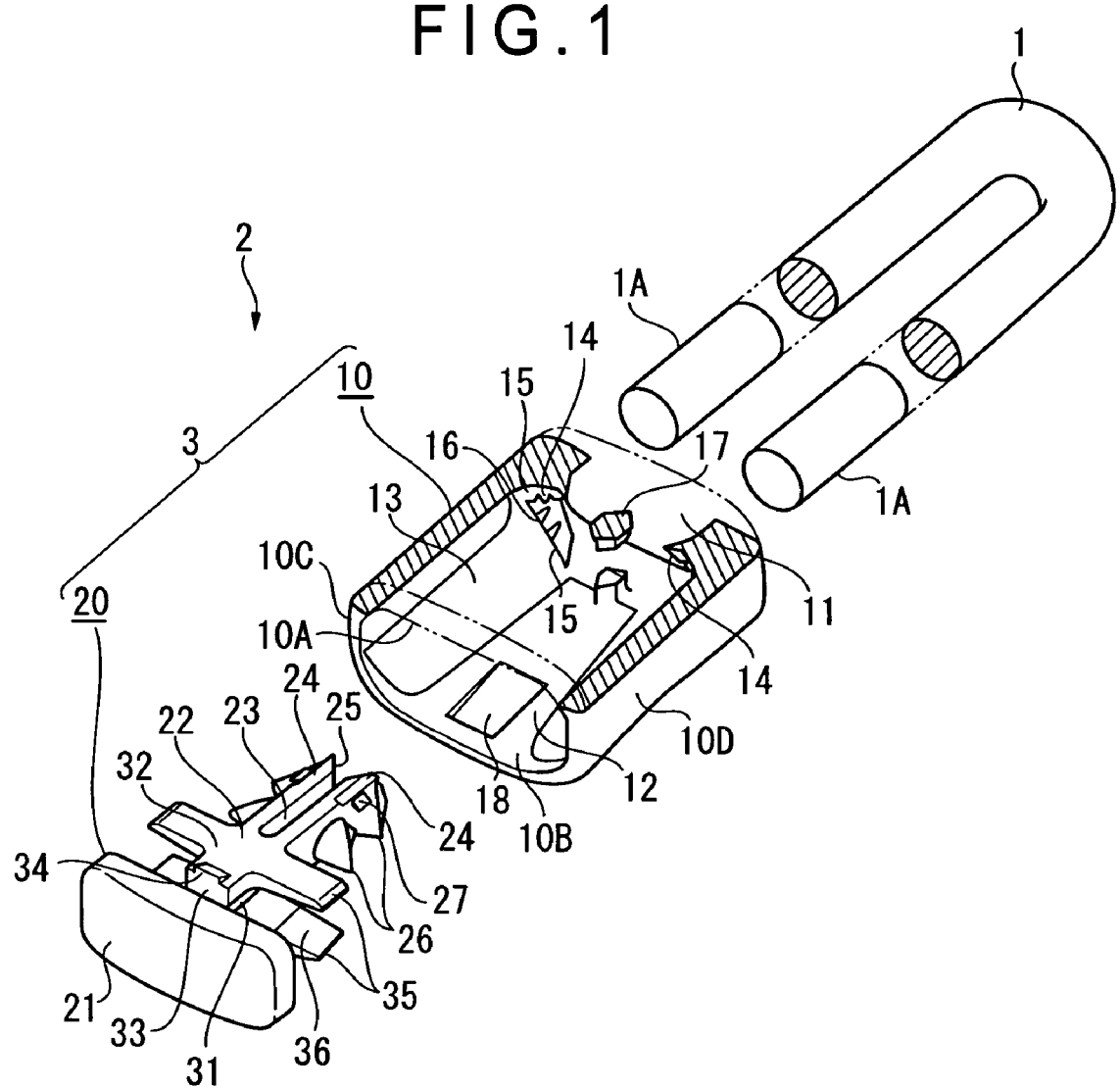
FIG. 1 is an exploded perspective view showing a socket and a plug of a first embodiment according to the present invention.
Figure 2:
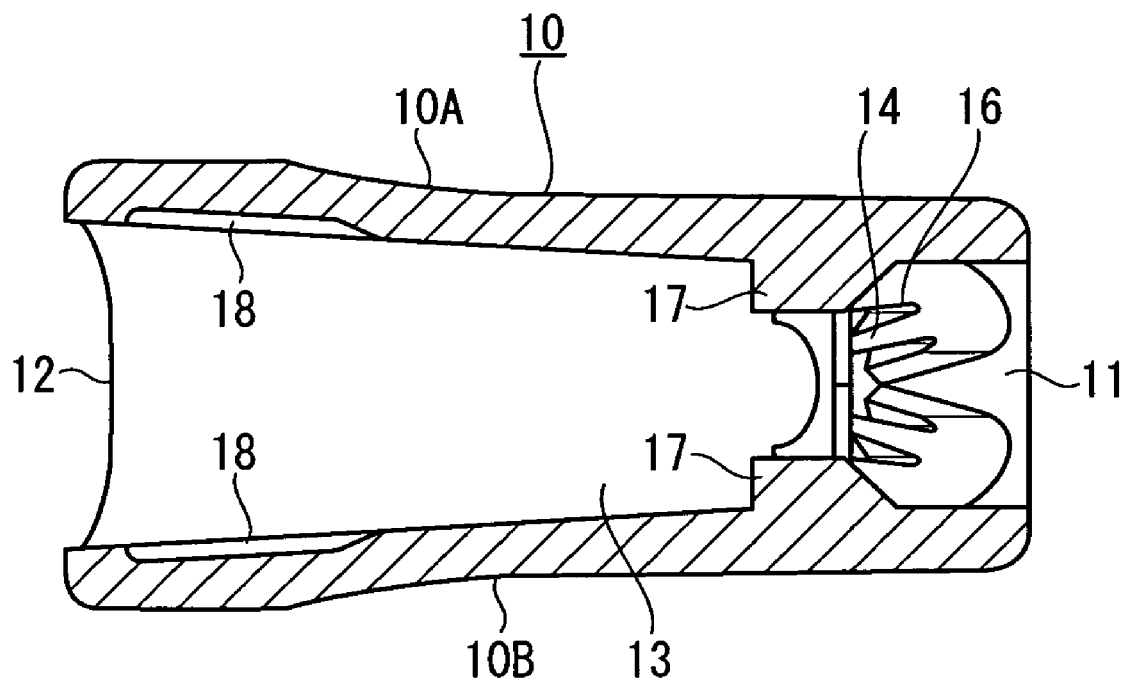
FIG. 2 is a vertical cross section showing the socket of the first embodiment.
Figure 3:
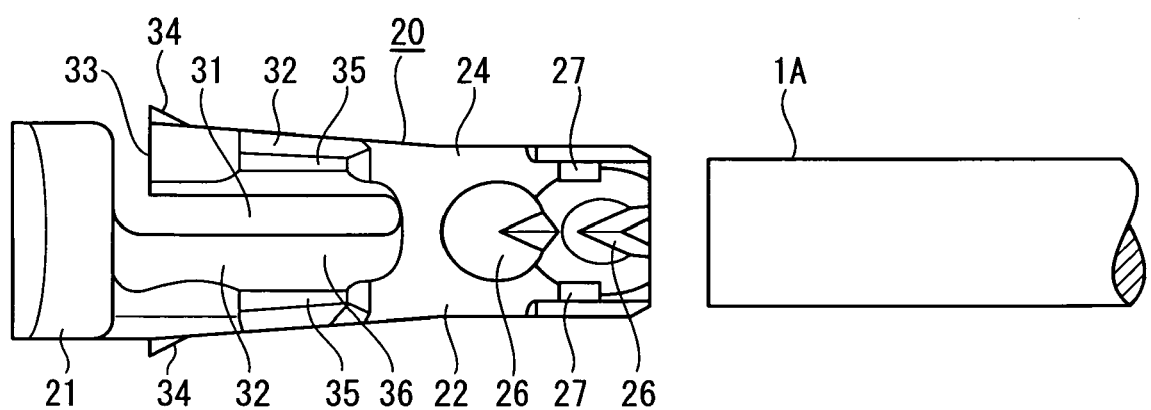
FIG. 3 is a side view showing the plug of the first embodiment.
Figure 4:
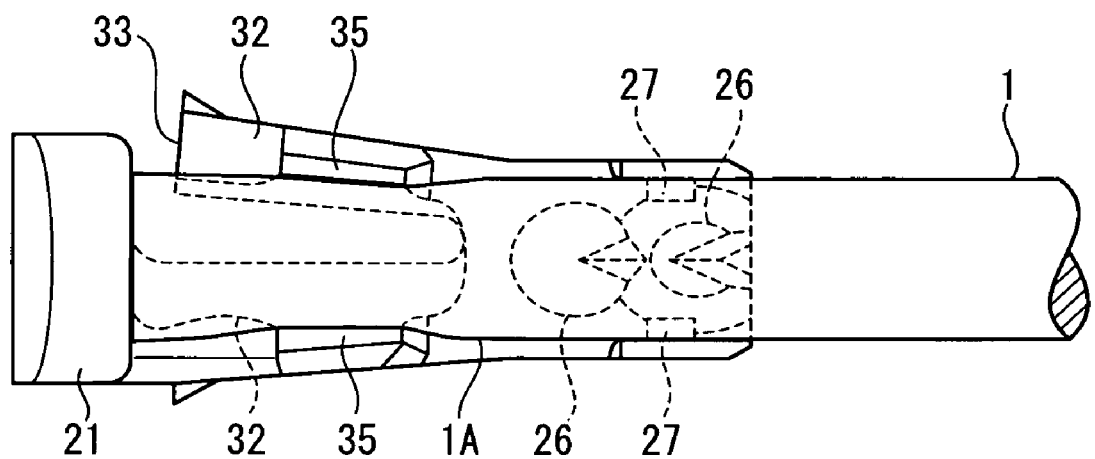
FIG. 4 is a side view showing the plug of the first embodiment to which a string end is temporarily fixed.
Figure 5:
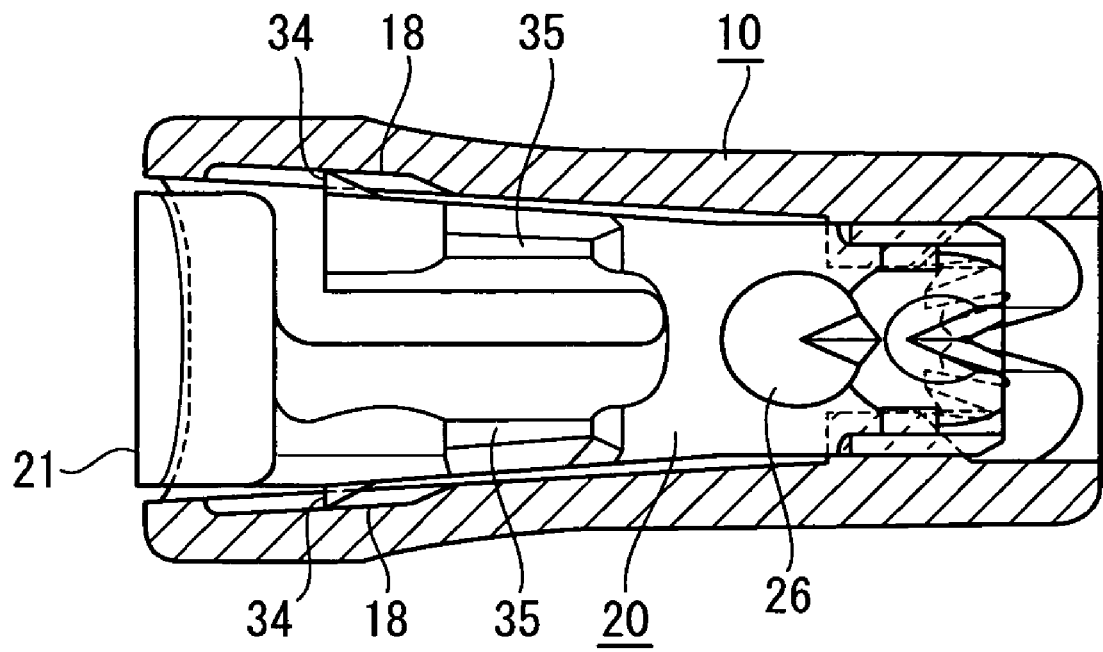
FIG. 5 is a vertical cross section showing the socket and the plug assembled in the socket of the first embodiment.
Figure 6:
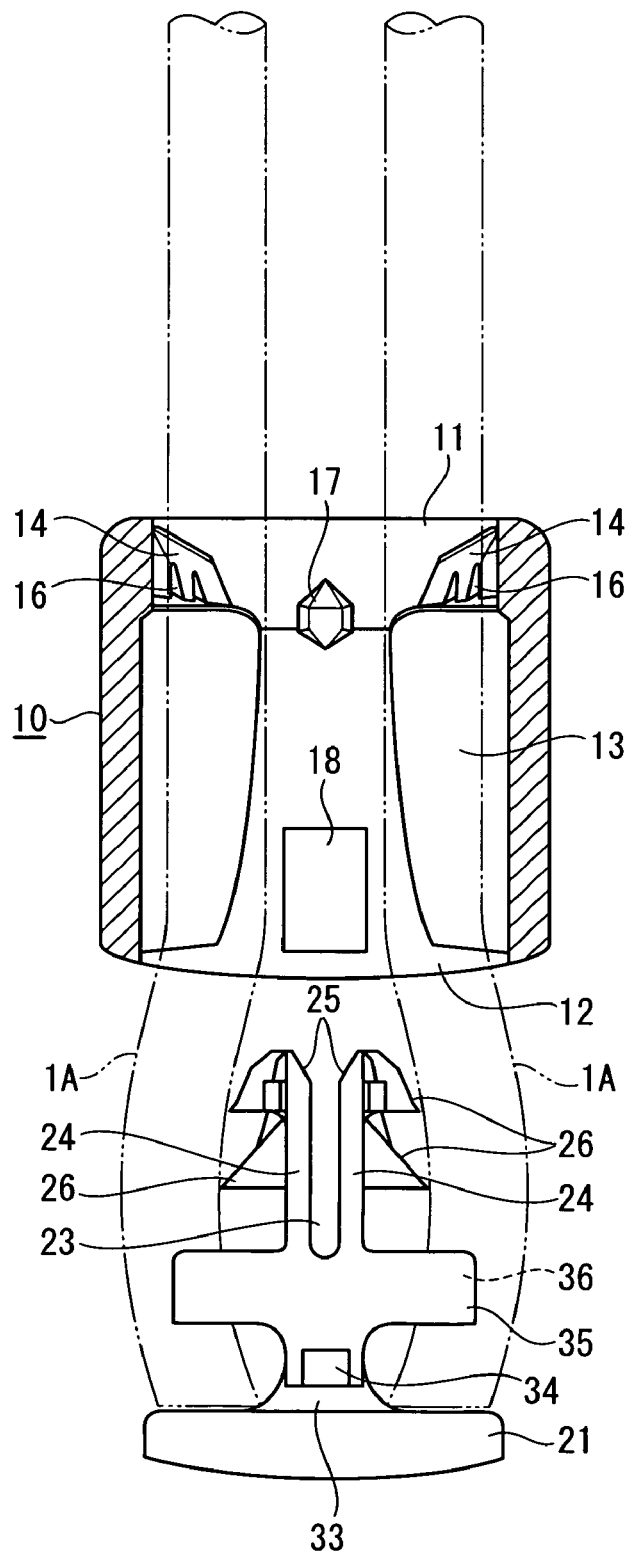
FIG. 6 is a view showing the socket and the plug of the first embodiment before the plug is inserted into the socket.
Figure 7:
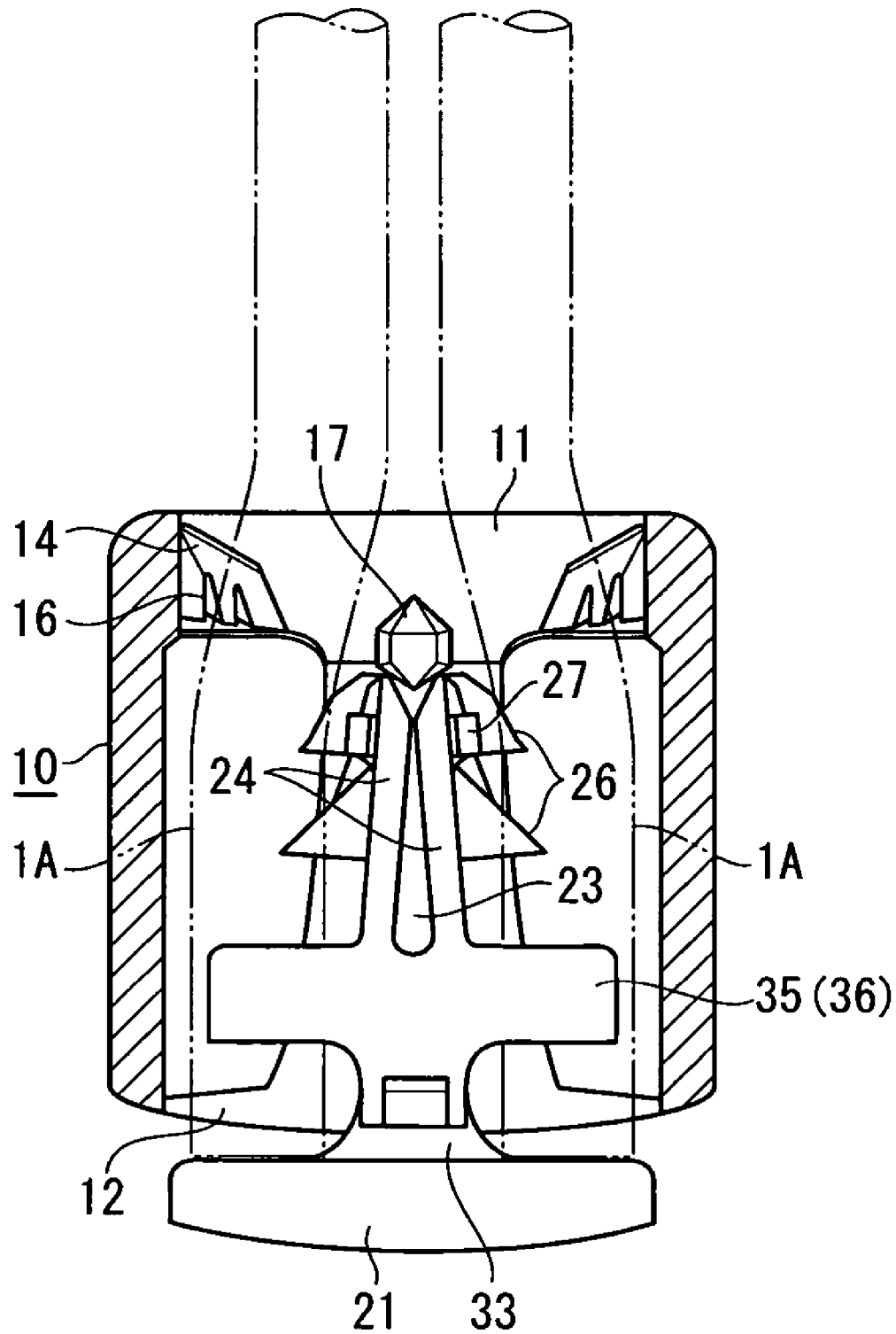
FIG. 7 is a view showing the socket and the plug of the first embodiment just before the plug is engaged with the socket.
Figure 8:
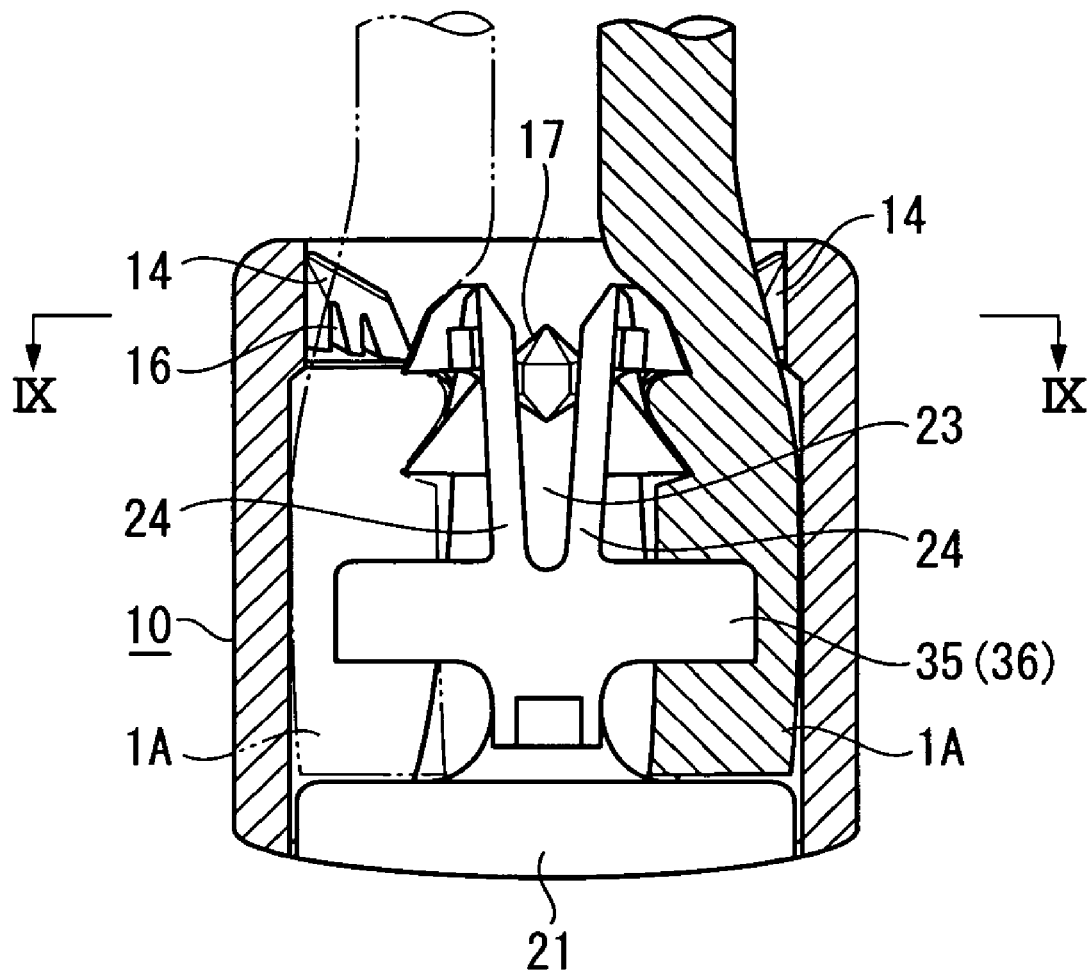
FIG. 8 is a view showing the socket and the plug of the first embodiment when the plug is engaged with the socket.
Figure 9:
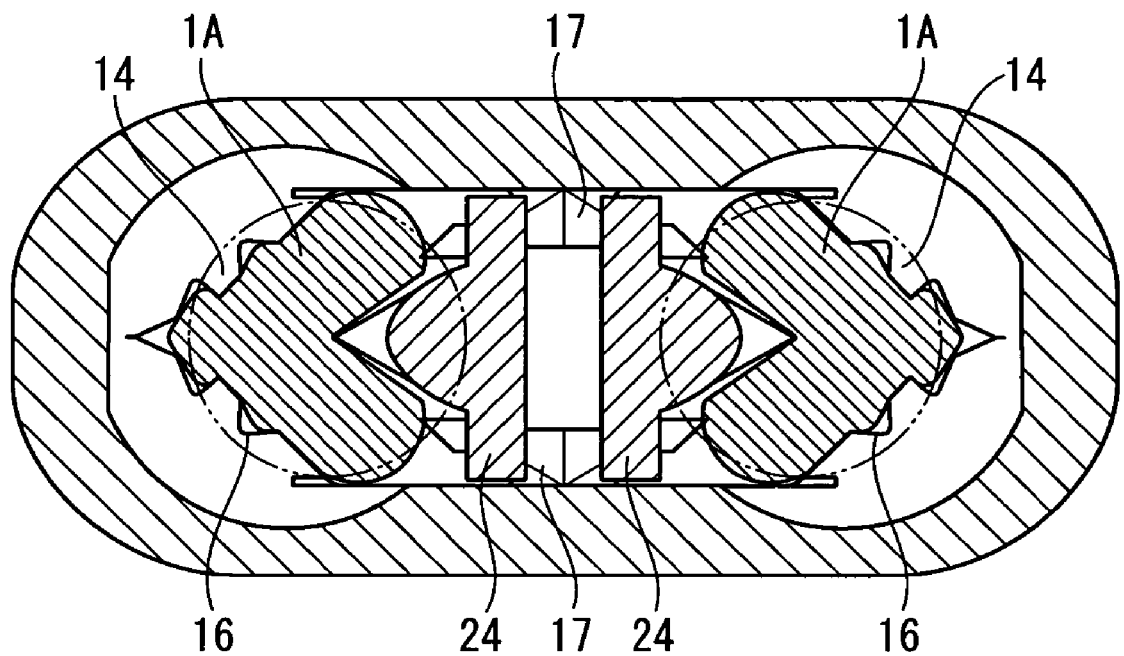
FIG. 9 is a cross section taken along IX-IX line in FIG. 8.

FIG. 1 is an exploded perspective view showing a socket 10 and a plug 20 that constitute a string holder 2 of the first embodiment. FIG. 2 is a vertical cross section showing the socket 10. FIG. 3 is a side view showing the plug 20. FIG. 4 is another side view showing the plug 20 in which a string end 1A is temporarily fixed. FIG. 5 is a cross section showing the socket 10 and the plug 20 assembled in the socket 10. FIG. 6 is a view showing the socket 10 and the plug 20 before the plug 20 is inserted into the socket 10. FIG. 7 is a view the socket 10 and the plug 20 just before the plug 20 becomes fully inserted into the socket 10. FIG. 8 is a view the socket 10 and the plug 20 when the plug 20 is fully engaged with the socket 10. FIG. 9 is a view (a cross section taken along IX-IX line in FIG. 8) showing the string ends that are held when the plug 20 is fully inserted into the socket 10.

[Description of Structure]

As shown in FIG. 1, the string holder 2 of the first embodiment includes a main body 3 that can accommodate the two string ends 1A of a string 1 that is folded in a U shape.

The string 1 is used, for example, (as a finger grip for moving a slider of a zipper) in a state in which the string 1 is threaded through a hole in the slider and folded in two and the string ends 1A are inserted into the string holder 2. The string 1 may have any cross-sectional shape (i.e. may be a round or flat string, for example), or may be of any material. However, the present invention can be more advantageous when handling a string having a great diameter reduction ratio such as a rubber string. The main body 3 is provided with the socket 10 having a substantially flat cylindrical shape and the plug 20 to be inserted and engaged in the socket 10. The socket 10 and the plug 20 are made as synthetic resin components formed by injection molding.

As shown in FIGS. 1, 2 and 5, the socket 10 is a substantially flat cylindrical body having: linear walls 10A, 10B opposing to each other with a space therebetween; and arc walls 10C, 10D formed on both sides of the linear walls 10A, 10B. The cylindrical body further has: a string opening 11 at one end for the string ends 1A to be inserted; a plug opening 12 at the other end for the plug 20 to be inserted; and an accommodation section 13 in a middle portion for accommodating a predetermined length of the string ends 1A inserted from the string opening 11, the accommodation section 13 being in communication with the string opening 11 and the plug opening 12.

The accommodation section 13 is formed to have substantially the same cross-sectional shape (when cut in a direction intersecting a direction in which the plug 20 is inserted) as the plug opening 12 and to maintain the substantially same shape (i.e. the substantially flat cylindrical shape) in the plug 20 inserting direction. More specifically, the gap between the arc walls 10C, 10D is adapted to be substantially the same at any position in the plug 20 inserting direction, while the gap between the linear walls 10A, 10B gradually becomes smaller to form a tapered shape as advancing in the plug 20 inserting direction.

Two holding sections 14 for holding the two string ends 1A accommodated in the accommodation section 13 are provided on the string opening 111 side of the accommodation section 13. Each of the widening sections 17 is provided in the middle of the two holding sections 14 at a position to be sandwiched by the two string ends 1A.

The holding sections 14 are formed on the string opening 11 side as a V-groove on the respective arc walls 10C, 10D. Specifically, a pair of inclined walls 15 are formed so as to extend from the arc walls 10C, 10D toward the inside of the accommodation section 13 to reach middle positions on the opposing linear walls 10A, 10B, forming the V-groove (the holding section 14). The inclined wall 15A is provided with a plurality of minute V-grooves defined in an edge of the V-groove in order to increase resistance against pulling force of the string ends 1A (i.e. to increase biting ability).

The widening sections 17 are projections formed at the middle of the two holding sections 14 which inwardly project from the respective linear walls 10A, 10B. The projections are tapered as advancing in the reverse direction of that in which the plug 20 is inserted into the socket 10 (the plug-inserting direction, the direction in which later-described pressing legs 24 are inserted into the accommodation section 13).

Engaging dents 18 are formed on the plug opening 12 side of the accommodation section 13 for engaging with the plug 20 when the plug 20 is inserted to a predetermined position in the socket 10, more specifically when a below described press section 22 of the plug 20 is inserted into the socket 10. The engaging dents 18 are defined in a middle position of respective inner surfaces of the linear walls 10A, 10B on the plug opening 12 side so as to have a predetermined depth and width. A step of the engaging dent 18 on the string opening 11 side is formed to be a tapered wall sloping toward the center portion of the accommodation section 13 as advancing toward the string opening 11.

As shown in FIGS. 1, 3, 4 and 5, the plug 20 has a base 21 to close the plug opening 12 of the socket 10; and the press section 22 integrally extending from the base 21 to be inserted in the accommodation section 13 of the socket 10.

The base 21 has an outline that fits the plug opening 12 of the socket 10. That is, when seen in the plug-inserting direction, the base 21 has a substantially flat cylindrical shape with a substantially constant height.

The press section 22 has: a pair of pressing legs 24 capable of being widened toward the respective holding sections 14 to press the string ends 1A to the holding sections 14 on a tip side; and temporarily fixing sections 36 each having sandwiching pieces 35 capable of being elastically deformed to temporarily fix the string end 1A on a base side.

More specifically, the press section 22 has a first slit 23 extending from a middle position to a tip end to form the separate two pressing legs 24 and a second slit 31 extending from a middle position to the base side, the second slit 31 being substantially perpendicular to the first slit 23.

The pressing legs 24 each have an inclined surface 25 (a tapered surface) outward expanding as advancing in the plug 20 inserting direction. The outward tapered surfaces abut to the widening sections 17, when more than half of the plug 20 is inserted into the socket 10, or in the first embodiment when the plug is almost fully inserted into the socket 10 (i.e. when the press section 22 of the plug 20 is inserted into the socket 10). When the plug 20 is further inserted from this state, the pressing legs 24 are widened toward the respective holding sections 14 as the insertion progresses. Two biting projections 26 that project to bite in the string end are provided on side surfaces of the pressing legs 24 opposite to the facing surfaces in the first slit 23. Controlling projections 27 are provided on both sides of the pressing legs 24 with the biting projection 26 on the tip side interposed. The biting projection 26 has a conical shape of which apex angle is displaced toward the base side of the press section 22 to be off the bottom face of the circular cone.

A notch 33 is formed between the base 21 and one of separated walls 32 that are separated by the second slit 31. An engaging claw 34 to be fit with the engaging dent 18 of the socket 10 is formed and a pair of the sandwiching piece 35 opposing with each other with the second slit 31 interposed are formed on the separated walls 32. The temporarily fixing sections 36 are formed between the opposing sandwiching pieces 35. The engaging claw 34 is gradually slanted outward from an upper surface of the separated wall 32 toward the base 21 and is cut at a right angle relative to the upper surface to have right-triangle cross section. The inner surface of the sandwiching piece 35 is formed to be an outward tapered surface that gradually slopes outward as advancing from a middle portion to a tip end, thereby facilitating an insertion of the string end 1A into between the sandwiching pieces 35.

[Description of Assembling]

Initially, as shown in FIG. 6, the two string ends 1A of the string 1 are inserted into the socket 10 from the string opening 11, which are drawn through the accommodation section 13 out of the plug opening 12 and then fixed in the temporarily fixing sections 36 of the plug 20. More specifically, the string ends 1A are respectively inserted between the sandwiching pieces 35 of the plug 20. When the string end 1A is inserted in the plug 20 in the socket 10, even when the string end 1A having a larger thickness than the gap between the sandwiching pieces 35, the string end 1A can be temporarily fixed by being held by the pair of the sandwiching pieces 35 because one of the separated walls 32 having the sandwiching piece 35 is elastically deformable outward (i.e. the notch 33 allows elastic deformation of the separated wall 32).

Subsequently, as shown in FIG. 7, when the string 1 is pulled out from the socket 10 while the base 21 is pressed toward the socket 10 with a finger, the two pressing legs 24 of the plug 20 are elastically deformed toward each other as the plug 20 is inserted into the socket 10. Specifically, the two string ends 1A are pulled in an abutment to the holding sections 14 of the socket 10, which generates reaction force from the holding sections 14. Such reaction force is applied to the two pressing legs 24 via the string ends 1A, so that the pressing legs 24 are elastically deformed toward each other. This state is maintained until a point just before the plug 20 becomes fully inserted into the socket 10. Accordingly, a great load will not be generated even when the plug 20 is inserted relatively deeply into the socket 10, because the two pressing legs 24 are elastically deformed toward each other before the plug 20 becomes fully inserted into the socket 10. Thus, the plug 20 can be smoothly inserted into the socket 10.

Next, when the plug 20 is inserted into the socket 10 to a position just before the plug 20 is fully inserted into the socket 10, the pressing legs 24 of the plug 20 abut to the widening sections 17 of the socket 10.

As shown in FIG. 8, when the plug 20 is further inserted from this state into the socket 10 and becomes fully inserted into the socket 10, the pressing legs 24 of the plug 20 are elastically deformed away from each other to be widened toward the respective holding sections 14 of the socket 10. Then, the string ends 1A accommodated within the accommodation section 13 are pressed by the pressing legs 24 toward the holding sections 14. As a result, since the string ends 1A accommodated in the accommodation section 13 are sandwiched and held by the holding sections 14 and the pressing legs 24, the string ends 1A are firmly fixed while being sandwiched and held by the holding sections 14 and the pressing legs 24.

At this time, as shown in FIG. 9, the string ends 1A are pressed by the pressing legs 24 and the biting projections 26 into the V-grooves of the holding sections 14 and into the minute V-grooves 16 defined in the inner edges of the V-grooves, thereby giving great resistance against the pulling direction force. Further, since the widening sections 17 are disposed in the middle of the holding sections 14, the string ends 1A are perpendicularly pressed by the pressing legs 24 substantially at the center of the holding sections 14 (i.e. substantially at a central position thereof), the string ends 1A can be sandwiched and held by a strong holding force. In addition, since the biting projections 26 of the plug 20 bite into the string ends 1A, the string ends 1A can be securely fixed.

[Advantages of the Embodiment]

(1) Since the pressing legs 24 does not abut to the widening sections 17 until the plug 20 becomes fully inserted into the socket 10, the plug can be smoothly inserted into the socket 10. Hence, the plug 20 can be smoothly inserted into the socket 10 until a point just before the plug 20 becomes fully inserted into the socket 10, thereby facilitating the assembling process.

(2) Since the widening sections 17 abuts to the pressing legs 24 at a point just before the plug 20 becomes fully inserted into the socket 10 to be widened toward the holding sections 14, the string ends 1A accommodated in the accommodation section 13 can be pressed to the holding sections 14 by the pressing legs 24. In other words, the string ends 1A accommodated in the accommodation section 13 can be sandwiched and held by the holding sections 14 and the pressing legs 24, so that the string ends 1A can be firmly fixed. Hence, even when the string 1 is made of a material having a great diameter reduction ratio such as elastomer, the string ends 1A can be securely and firmly fixed in the holding sections 14, preventing the string 1 from falling off, so that the immovably attaching ability can be enhanced.

(3) Since the plug 20 is constituted of the base 21 to shut the plug opening 12 of the socket 10 and the press section 22 that is integrally formed to extend from the base 21 and is inserted in the accommodation section 13, the plug opening 12 of the socket 10 can be shut by the base 21 of the plug 20. Thereby, a good appearance can be obtained, while preventing dust from entering into the socket 10.

(4) The plurality of pressing legs 24 capable of being widened toward the holding sections 14 are provided to the press section 22 and the widening sections 17 are provided to the socket 10, thereby facilitating the manufacturing process. For example, if the plurality of pressing legs capable of being widened are provided to the socket 10, the plurality of pressing legs capable of being widened need to be formed inside the cylindrical socket 10, the manufacturing process becomes troublesome. In contrast, the manufacturing process can be facilitated in the arrangement according to the first embodiment, where when the plug and the socket are manufactured by injection molding using synthetic resin, the die machining can be relatively easy (as compared with an arrangement where the pressing legs 24 are formed on the socket 10).

(5) Since the pressing legs 24 are formed on the tip end portion of the press section 22 while the widening sections 17 are formed in the vicinity of the string opening 11 of the socket 10, the widening sections 17 abut to the pressing legs 24 in such a state in which the plug 20 is almost fully inserted into the socket 10. Accordingly, the pressing legs 24 can be stably widened. Specifically, when the plug 20 is almost fully inserted into the socket 10, the posture of the plug 20 relative to the socket 10 is stable, so that the pressing legs 24 can be stably widened.

(6) Since the widening sections 17 are tapered in the direction reverse to the inserting direction of the plug 20 into the socket 10, the pressing legs 24 can be easily widened when the plug 20 is inserted into the socket 10 and the widening sections 17 abut to the pressing legs 24.

(7) Since the widening sections 17 are respectively disposed in the middle of the two holding sections 14, the string ends 1A are perpendicularly pressed by the pressing legs 24 substantially at the center of the holding sections 14 (i.e. substantially at a central position thereof), the string ends 1A can be sandwiched and held by a strong force. In addition, since the biting projections 26 of the plug 20 bite into the string ends 1A, the string ends 1A can be securely fixed.

(8) Since the plug 20 has the temporarily fixing section 36 for temporarily fixing the string ends 1A, the string ends 1A are temporarily fixed to the temporarily fixing section 36 of the plug 20 after being inserted from the string opening 11 of the socket 10 through the accommodation section 13 and pulled out from the plug opening 12. In this state, by pulling the string ends 1A back while inserting the plug 20 into the plug opening 12 of the socket 10, the string ends 1A can be accommodated in the socket 10 in a predetermined posture. Subsequently, the string ends 1A are pressed by the pressing legs 24 to the holding sections 14, so that the secure and immovable attachment can be obtained.

(9) Since the first slit 23 forming the pressing legs 24 is provided on the tip end portion of the press section 22 of the plug 20 along the plug 20 inserting direction, the pressing legs 24 can be elastically deformed to be away from each other due to the first slit 23, so that the string ends 1A can be securely held by the pressing legs 24. Further, since the notch 33 is formed on one of the separated walls 32 having the sandwiching pieces 35, that work as the temporarily fixing sections 36, the string ends 1A can be securely held by virtue of the elastic deformation of the both separated walls 32 even when the thickness of the string end 1A varies.

[Modifications]

It should be appreciated that the scope of the present invention is not limited to the first embodiment, but includes various modifications and improvements as long as an object of the present invention can be achieved.

Although the plurality of pressing legs 24, which are capable of being widened toward the holding sections 14 and press the string ends 1A to the holding sections 14, are provided to the plug 20 while the widening sections 17, which abut to the pressing legs 24 at a time just before the plug 20 becomes fully inserted into the socket, are provided to the socket 10 in the first embodiment, the plug 20 and the socket 10 may be arranged the other way around.

That is, the plurality of pressing legs 24 may be provided on the socket 10, and the widening sections 17 may be provided on the plug 20. For example, the alternative arrangement, in which the plurality of pressing legs 24 are provided inside the socket 10 so as to be movable toward and away from each other; while the plug 20 is provided with the widening sections 17 for moving the plurality of pressing legs 24 to be away from each other, can provide similar advantages to the first embodiment.

In the above-described first embodiment, there employed is the arrangement in which the pressing legs 24 of the plug 20 abut to the widening sections 17 of the socket 10 just before the plug 20 becomes fully inserted into the socket 10; and subsequently the pressing legs 24 are widened by the widening sections 17 as the plug 20 is further inserted. However, an alternative arrangement may be employed, in which the pressing legs 24 of the plug 20 abut to the widening sections 17 when at least substantially more than half of the plug 20 is inserted into the socket 10; and subsequently the pressing legs 24 are widened by the widening sections 17 as the plug 20 is further inserted.

Figure 10:
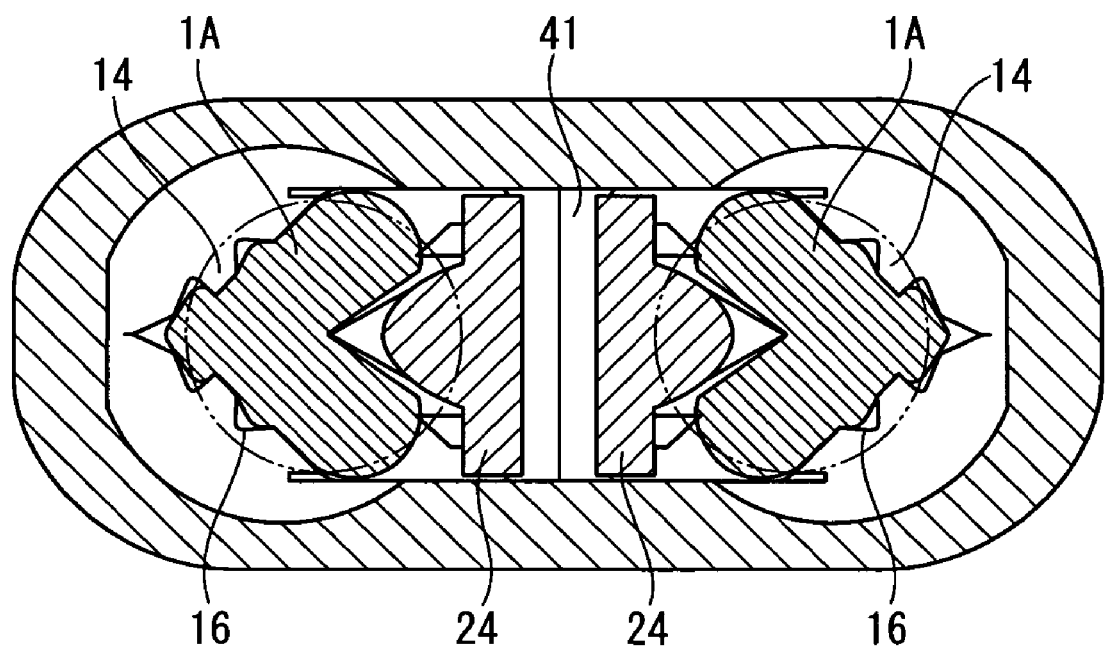
FIG. 10 is a view showing a modification of the present invention.

In the first embodiment, although the projections are formed on the respective inner surfaces of the linear walls 10A, 10B of the socket 10 to serve as the widening sections 17, the widening sections 17 may not be formed as projections. For example, as shown in FIG. 10, a partition 41 bridging the linear walls 10A, 10B of the socket 10 may be alternatively provided as the widening sections 17. The point is that any other structure may be employed as long as the pressing legs 24 can be widened toward the holding sections 14.

Although the string holder 2 for end-treating the two string ends 1A is explained in the first embodiment, the string holder may be for end-treating three or more string ends (the string may be one or more). In such a case, the number of the holding sections 14 or the pressing legs 24 to be provided to the socket 10 should correspond to the number of the string ends 1A.

In the first embodiment, the socket 10 is provided with the engaging dents 18; and the plug 20 is provided with the engaging claws 34 such that, when the plug 20 is inserted into the socket 10, the engaging claws 34 are respectively engaged with the engaging dents 18 to prevent the plug 20 from being disengaged from the socket 10. However, the engaging dents 18 and the engaging claws 34 may not be provided. Specifically, when the string ends 1A are sandwiched and held by the holding sections 18 and the pressing legs 24, the holding force combines the socket 10, the plug 20 and the string ends 1A together, where the engaging dents 18 and the engaging claws 34 may not be provided.

Although the press section 22 of the plug 20 is provided with the second slit 31 in the first embodiment, the second slit 31 may not be provided. It is because the string ends 1A can be fixed by the elasticity of the sandwiching pieces 35 themselves. Similarly, although the temporarily fixing sections 36 are provided to the plug 20 in the first embodiment, but are not particularly essential.

Further, in the first embodiment and the modification, the widening sections 17 and the widening section 41 are provided to the socket 10, while the pressing legs 24 and the holding sections 14 are provided to the plug 20. However, the widening sections 17, 41 may be provided to the plug 20 and the pressing legs 24 and the holding sections 14 may be provided to the socket 10.

FIGS. 11 to 14 show a second embodiment of the present invention. Note that, in the second embodiment, the basic arrangements of the string holder 2 (the socket 10, the plug 20 and the like) are the same as those of the first embodiment. Hence, the same reference numerals are assigned to the common components to omit the same description.

Figure 11:
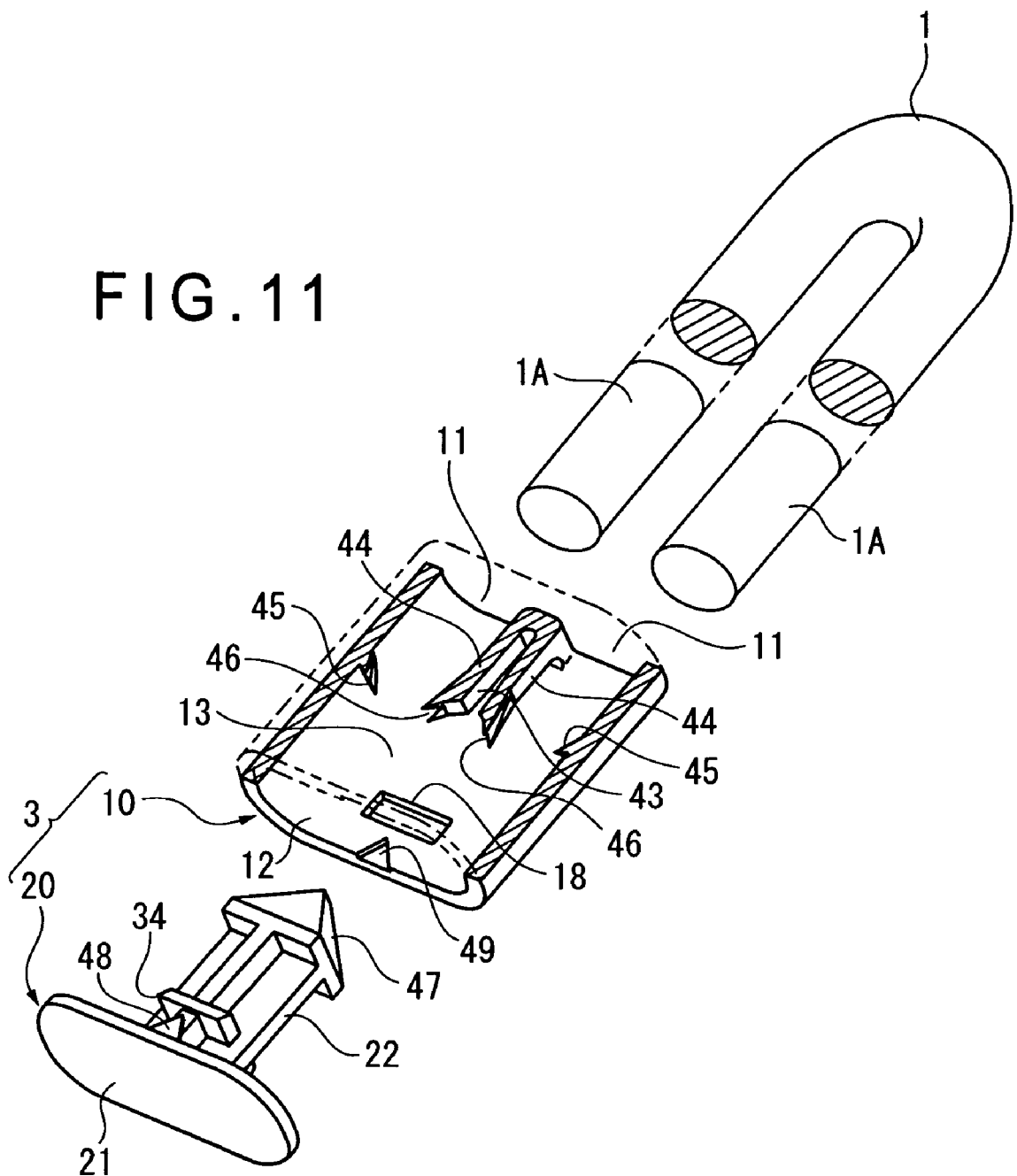
FIG. 11 is an exploded perspective view showing a second embodiment according to the invention.

In FIG. 11, the socket 10 is provided with the two string openings 11 on one side, through which the two ends of the string 1 (the string ends 1A) can be inserted. The socket 10 is provided with the plug opening 12 on the other side of the string openings 11, into which the plug 20 is inserted. The inserted plug 20 bites in and holds the two string ends 1A.

Figure 12:
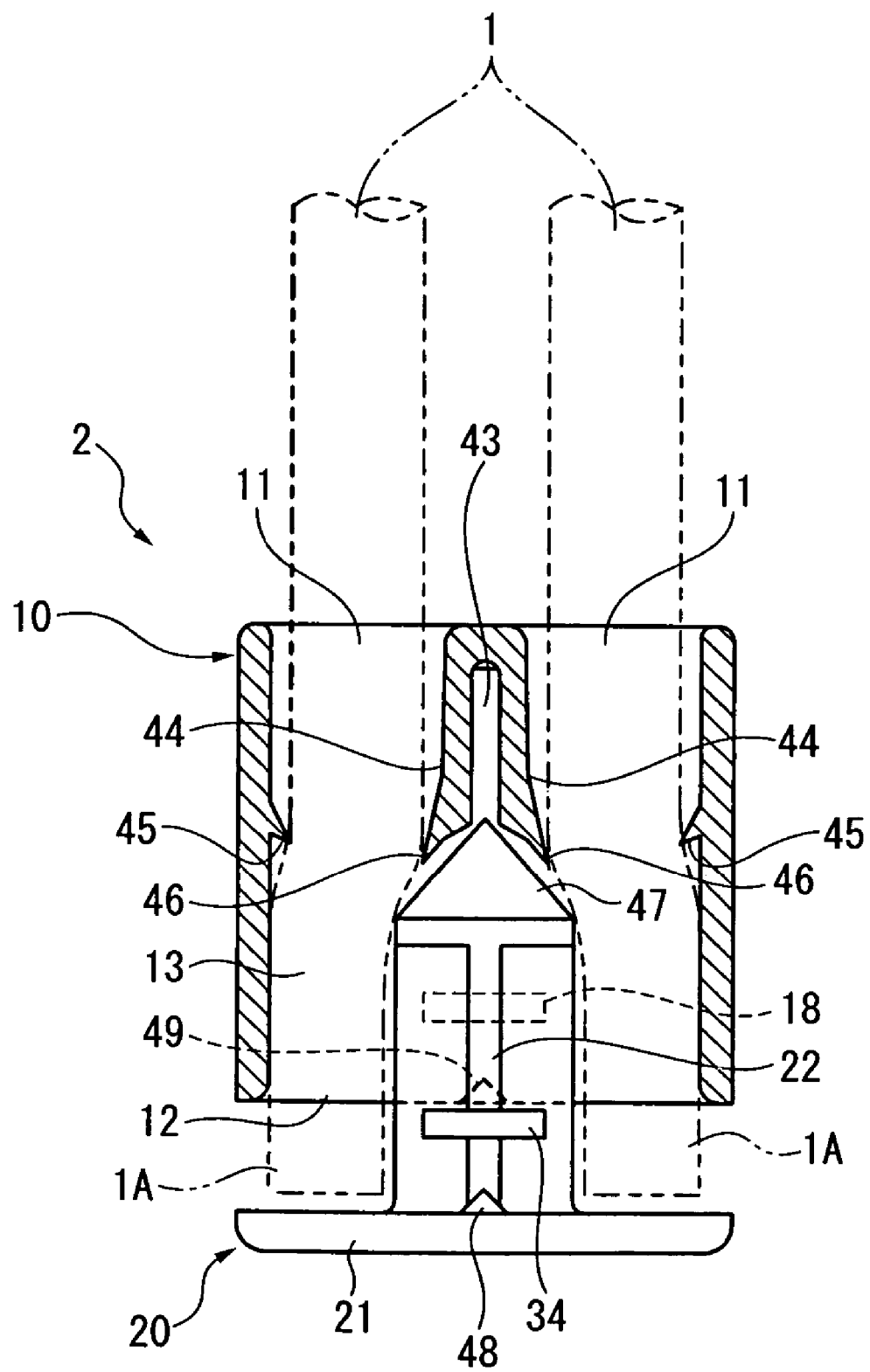
FIG. 12 is a cross section showing a plug and a socket of the second embodiment when the plug is being inserted in the socket.
Figure 13:
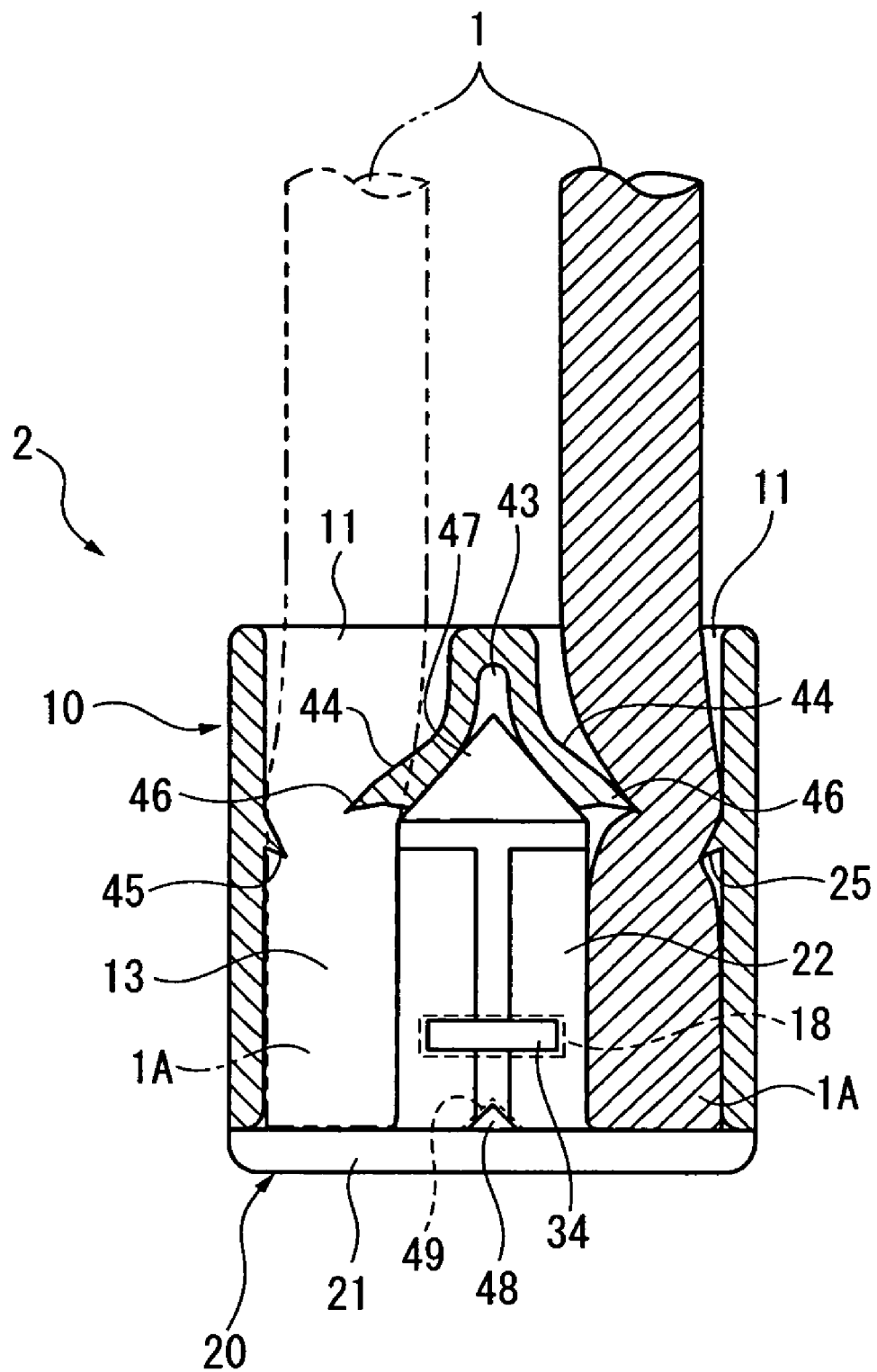
FIG. 13 is a cross section showing the plug and the socket of the second embodiment when the plug is completely inserted in and assembled with the socket.
Figure 14:
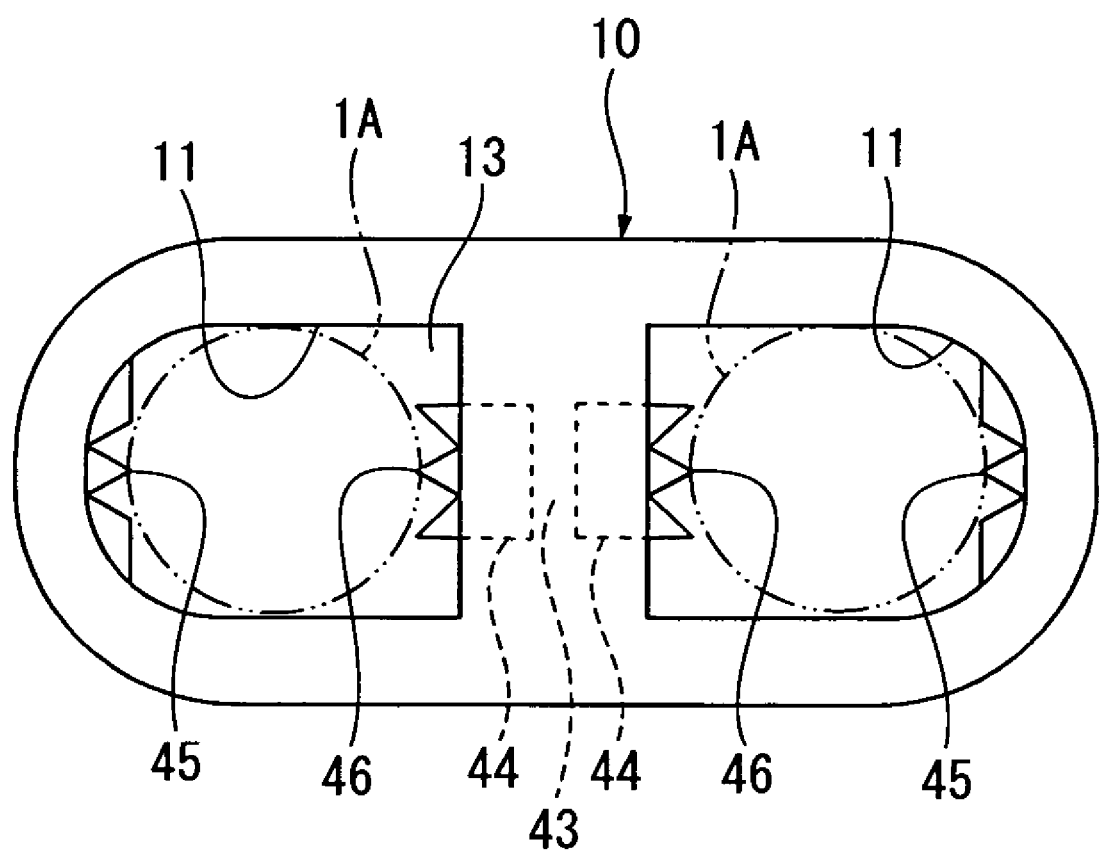
FIG. 14 is a cross section showing the socket and the plug assembled in the socket of the second embodiment.

As shown in FIGS. 12 to 14, a pair of pressing legs 44 is provided inside the socket 10, the deformable pair of pressing legs 44 extending from the boundary of the two string ends 11 toward the inside of the accommodation section 13. A biting projection 46 is formed on a tip end of each pressing leg 44. Holding sections 45 are formed on an inner wall of the socket 10. Each pair of the holding section 45 and the biting projection 46, which are opposingly disposed, bites in and holds each of the string ends 1A.

The plug 20 includes the plate-shape base 21 to shut the plug opening 12 of the socket 10 and the press section 22 extending from the base 21. Provided on the tip end of the press section 22 is a widening section 47 in a square pyramid shape, the widening section 47 having a tip end tapered in the insertion direction into the socket 10. Thus, inserting the plug 20 into the socket 10 from the plug opening 12 (see FIG. 12) makes the widening section 47 on the tip end of the press section 22 barge into a slit 43 between the pair of pressing legs 44, so that the pressing legs 44 are deformed away from each other (see FIG. 13). Accordingly, the holding sections 45 and the biting projections 46 bite in and hold the string ends 1A therebetween, thereby fixing the string ends 1A.

Note that the slit 43 between the pressing legs 44 and the widening section 47 on the tip end of the press section 22 guide the direction of the plug 20 when the plug 20 is inserted into the socket 10. Provided on the base side of the press section 22 is a guide 48 in a triangular pyramid. On the peripheral end of the plug opening 12 in the socket 10, a to-be-guided portion 49 is formed in a step-like shape. The guide 48 and the to-be-guided portion 49 are engaged with each other when the plug 20 is inserted in the socket 10, thereby guiding the plug 20 to a predetermined position in the socket 10. Thus, in the operation of inserting the plug 20 into the socket 10, the plug 20 and the socket 10 can be appropriately guided to become assembled in a manner shown in FIG. 13.

The engaging claw 34 is formed in the middle of the widening section 47. The engaging dent 18 is formed in the inner wall of the socket 10. Accordingly, when the plug 20 is inserted into the socket 10, the engaging claw 34 and the engaging dent 18 become engaged with each other to be maintained assembled as the string holder 2 as shown in FIG. 13.

Next, operations of the second embodiment will be explained.

As shown in FIG. 11, the two string ends 1A (both ends of a string 1 or two ends of two strings 1) are aligned and inserted into the string openings 11 of the socket 10. The string ends 1A are forwarded so as to reach the plug opening 12 (see FIG. 12). Then, the plug 20 is set to face the plug opening 12 and the press section 22 is inserted in the plug opening 12. Accordingly, the press section 22 goes into the socket 10 and the tapered widening section 47 on the tip end of the press section 22 barges into the slit 43, thereby making the pair of pressing legs 44 at the boundary of the two string ends 1A be deformed apart from each other. This deformation makes the holding sections 45 and the biting projections 46 bite in and hold the respective string ends 1A (see FIG. 13). When the press section 22 reaches a predetermined depth inside the socket 10, the engaging claw 34 and the engaging dent 18 become engaged with each other, thereby maintaining the socket 10, the plug 20 and the string 1 in a state shown in FIG. 13.

As described above, the second embodiment illustrated in FIGS. 11 to 14 can also provide the unique advantages of the present invention.

Note that shapes, materials, structures and the like of details of the above-described embodiments can be changed in an appropriate manner as long as the function of each component can be maintained. In addition, how to form components such as integrally forming components or combining components separately formed may be selected for an implementation of the invention.

The aforesaid embodiments each are an example in which the present invention is applied on a string holder for fixing a string used for operating a zipper slider. However, the scope of the invention is not restricted thereto, and can be alternatively utilized as a stopper for end-treating a string.

The priority application Number JP2005-215709 upon which this patent application is based is hereby incorporated by reference.

What is claimed is:

1. A string holder, comprising: a main body that can accommodate a plurality of string ends, wherein the main body includes: a substantially cylindrical socket; and a plug to be inserted into the socket to be engaged with the socket, the socket has: a string opening for the string ends to be inserted therein; a plug opening for the plug to be inserted therein; an accommodation section for accommodating a predetermined length of the string ends inserted from the string opening, the accommodation section being in communication with the string opening and the plug opening; and a plurality of holding sections for holding the string ends accommodated in the accommodation section, one of the socket and the plug is provided with a pair of pressing legs capable of being widened toward the holding sections to press the string ends to the holding sections, a slit being provided between the pair of pressing legs, and the other of the socket and the plug is provided with at least one widening section that enters into the slit to urge the pressing legs toward the holding sections as the plug is inserted, the plug has a base, said base engaging the plug opening when the string ends are accommodated in the socket such that the accommodating portion is not in communication with an exterior of the socket through the plus opening, and either one of the pressing legs or the widening section being integrally extended from the base, and the socket and the plug each having a mating engagement portion, the mating engagement portions engage each other when the pressing legs are engaged toward the holding section and are kept widened, and the mating engagement portions preventing the plus from being disengaged from the socket.

2. A string holder as set forth in claim 1, wherein the plug has: a press section integrally formed to extend from the base to be inserted into the accommodation section, the pair of pressing legs are formed in the press section; and the widening section is formed on the socket.

3. A string holder as set forth in claim 2, wherein the pair of pressing legs are formed on a tip end portion of the press section opposite to the base, and the widening section is formed in the vicinity of the string opening of the socket.

4. A string holder as set forth in claim 2, wherein the widening section is tapered in a direction reverse to a direction in which the plug is inserted relative to the socket.

5. A string holder as set forth in claim 2, wherein the widening section is disposed between the plurality of holding sections.

6. A string holder as set forth in claim 2, wherein the holding section is formed as a V-groove widened toward the center of the socket.

7. A string holder as set forth in claim 2, wherein the plug is provided with at least one temporarily fixing section for temporarily fixing the string end.

8. A string holder as set forth in claim 7, wherein a first slit defining the pressing legs is formed in the tip end portion of the press section of the plug in a direction in which the plug is inserted, a second slit is formed in a base portion of the press section so as to be substantially orthogonal to the first slit, a notch is formed in the base portion of one of separated walls that are separated by the second slit, and sandwiching pieces opposing with each other with the second slit interposed are projectingly formed on the respective separated walls, the opposing sandwiching pieces defining the temporarily fixing section.

9. A string holder as set forth in claim 2, wherein the slit is opened to a side opposite to the base.

10. A string holder comprising:

a main body that can accommodate a plurality of string ends, wherein:

the main body includes: a substantially cylindrical socket; and a plug to be inserted into the socket to be engaged with the socket, the socket has: a string opening for the string ends to be inserted therein; a plug opening for the plug to be inserted therein; an accommodation section for accommodating a predetermined length of the string ends inserted from the string opening, the accommodation section being in communication with the string opening and the plug opening; a plurality of holding sections for holding the string ends accommodated in the accommodation section; a pair of pressing legs capable of being urged toward the holding sections to press the string ends to the holding sections; and a slit being provided between the pair of the pressing legs, the plug is provided with a base and a widening section, the base engaging the plug opening when the string ends are accommodated in the socket such that the accommodating portion is not in communication with an exterior of the socket through the plug opening, the widening section entering into the slit to widen the pressing legs toward the holding sections as the plug is inserted, and the widening section being integrally extended from the base, and the socket and the plug each having a mating engagement portion, the mating engagement portions engaging each other when the pressing legs are engaged toward the holding section and are kept widened, and the mating engagement portions preventing the plug from being disengaged from the socket.

* * * * *

UNITED STATES PATENT AND TRADEMARK OFFICE
CERTIFICATE OF CORRECTION

| | |
|---|---|
| PATENT NO. | : 7,574,779 B2 |
| APPLICATION NO. | : 11/490352 |
| DATED | : August 18, 2009 |
| INVENTOR(S) | : Takahashi |

Page 1 of 1

It is certified that error appears in the above-identified patent and that said Letters Patent is hereby corrected as shown below:

Column 12,

Lines 25 and 33, "plus" should read --plug--.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO.       : 7,574,779 B2                              Page 1 of 1
APPLICATION NO.  : 11/490352
DATED            : August 18, 2009
INVENTOR(S)      : Yoshinobu Takahashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 435 days.

Signed and Sealed this

Seventh Day of September, 2010

David J. Kappos
*Director of the United States Patent and Trademark Office*